US012722228B2

(12) United States Patent
Nakashiba et al.

(10) Patent No.: US 12,722,228 B2
(45) Date of Patent: Sep. 1, 2026

(54) LASER PROCESSING MACHINE, LASER PROCESSING SYSTEM, ROTATOR UNIT APPARATUS, LASER PROCESSING METHOD, AND METHOD FOR PRODUCING PROBE CARD

(71) Applicant: NITTOKU KYOTO CO., LTD., Kyoto (JP)

(72) Inventors: Shinichi Nakashiba, Kyoto (JP); Osamu Endo, Kyoto (JP)

(73) Assignee: NITTOKU KYOTO CO., LTD., Kyoto (JP)

( * ) Notice: Subject to any disclaimer, the term of this patent is extended or adjusted under 35 U.S.C. 154(b) by 428 days.

(21) Appl. No.: 17/610,950

(22) PCT Filed: Jun. 8, 2021

(86) PCT No.: PCT/JP2021/021744

§ 371 (c)(1),
(2) Date: Nov. 12, 2021

(87) PCT Pub. No.: WO2021/251381

PCT Pub. Date: Dec. 16, 2021

(65) Prior Publication Data

US 2023/0092230 A1 Mar. 23, 2023

(30) Foreign Application Priority Data

Jun. 9, 2020 (JP) ................................ 2020-100120

(51) Int. Cl.
*B23K 26/06* (2014.01)
*B23K 26/062* (2014.01)
(Continued)

(52) U.S. Cl.
CPC ........ *B23K 26/0665* (2013.01); *B23K 26/062* (2015.10); *B23K 26/0643* (2013.01); *B23K 26/0648* (2013.01); *B23K 26/082* (2015.10); *B23K 26/083* (2013.01); *B23K 26/0869* (2013.01); *B23K 26/384* (2015.10); *B23K 26/388* (2013.01); *B23K 26/702* (2015.10)

(58) Field of Classification Search
CPC .............. B23K 26/062; B23K 26/0643; B23K 26/0648; B23K 26/0665; B23K 26/082;
(Continued)

(56) References Cited

U.S. PATENT DOCUMENTS 6,362,454 B1 * 3/2002 Liu .................... B23K 26/0665 219/121.73
6,518,543 B1 2/2003 Benz et al.
(Continued)

FOREIGN PATENT DOCUMENTS

JP 2009-233714 A 10/2009
JP 2019-025486 A 2/2019
(Continued)

OTHER PUBLICATIONS

Supplementary European Search Report dated Jul. 20, 2022 receiving in corresponding Patent Application No. 21798930.0.
(Continued)

*Primary Examiner* — Edward F Landrum
*Assistant Examiner* — Adam M Eckardt
(74) *Attorney, Agent, or Firm* — Scully, Scott, Murphy & Presser, P.C.

(57) ABSTRACT

A laser processing machine including: a laser source that emits a laser beam; a polarization rotator unit; a beam rotator unit; a lens; and a controller, which apply the laser beam to a workpiece, the polarization rotator unit includes a wave plate and first actuator that rotates the wave plate, the beam rotator unit includes an optical system that adjusts an irradiation angle of the laser beam to the workpiece by making an incident laser beam eccentric to output and making the laser beam incident on the lens at a position eccentric from a central axis, a second actuator rotates the optical system, the lens condenses the laser beam on the workpiece, the controller controls a rotational speed ratio
(Continued)

between the first actuator and the second actuator, and adjusts a polarized state of the laser beam by controlling the rotational speed ratio.

12 Claims, 17 Drawing Sheets

(51) Int. Cl.

| | |
|---|---|
| ***B23K 26/064*** | (2014.01) |
| ***B23K 26/08*** | (2014.01) |
| ***B23K 26/082*** | (2014.01) |
| ***B23K 26/384*** | (2014.01) |
| ***B23K 26/388*** | (2014.01) |
| ***B23K 26/70*** | (2014.01) . |

(58) Field of Classification Search
CPC .............. B23K 26/083; B23K 26/0869; B23K 26/384; B23K 26/388; B23K 26/702; B23K 26/064; B23K 26/06; B23K 26/08; B23K 26/70; B23K 26/10; B23K 26/38; B23K 26/382; H05K 3/00
See application file for complete search history.

(56) References Cited

U.S. PATENT DOCUMENTS 8,448,471 B2 * 5/2013 Kumatani ............ B23K 26/082 65/273
11,143,862 B2 * 10/2021 Kito ....................... G02B 26/10
2002/0158052 A1 * 10/2002 Ehrmann ........... B23K 26/0643 219/121.75
2005/0270957 A1 * 12/2005 Roh ....................... G11B 7/128 369/112.16
2010/0326138 A1 * 12/2010 Kumatani ............. C03B 33/023 65/286
2017/0368638 A1 * 12/2017 Tayebati ............ B23K 26/0626
2019/0204584 A1 7/2019 Hu et al.
2020/0139484 A1 5/2020 Okuma

FOREIGN PATENT DOCUMENTS

KR 20110001948 A 1/2011
KR 20190007626 A 1/2019

OTHER PUBLICATIONS

Japanese Office Action dated Mar. 16, 2021 received in 2020-100120.
Written Amendment filed May 13, 2021 in the corresponding Japanese Patent Application No. 2020-100120.
Written Opinion filed May 13, 2021 in the corresponding Japanese Patent Application No. 2020-100120.
Japanese Decision to Grant a Patent dated Jun. 1, 2021 received in 2020-100120.
Written Opinion filed May 13, 2021 in the corresponding Japanese Patent Application No. 92020-100120.
Korean Office Action dated Jun. 5, 2023 received in 10-2021-7036018.

* cited by examiner

FIG. 3

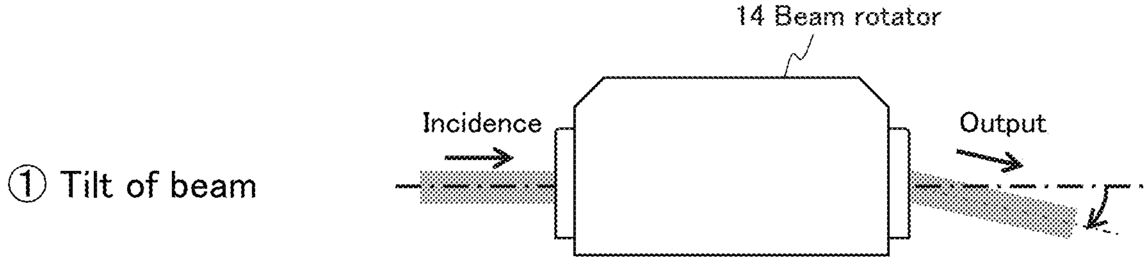
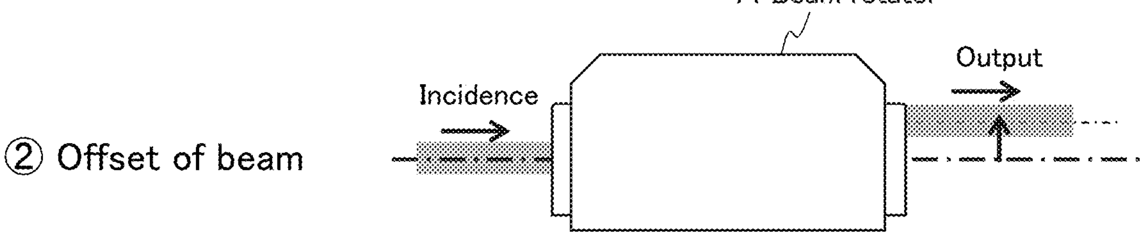
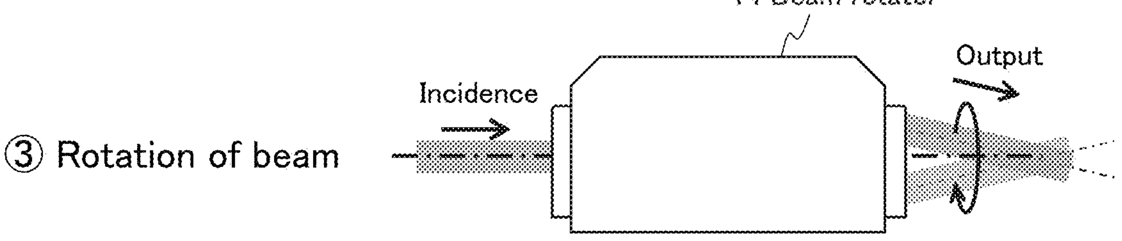
FIG. 4

Polarized state at each position of rotating beam

| | Polarization rotator : Beam rotator Rotational speed ratio | | | |
|---|---|---|---|---|
| Rotational phase difference | 0.5 : 1 | 0 : 1 | −0.5 : 1 | −1 : 1 |
| 0° | Radially polarized pattern | Linearly polarized pattern (horizontal) | Quadrangle polarized pattern | Hexagonal polarized pattern |
| 45° | Azimuth polarized pattern | Linearly polarized pattern (vertical) | Quadrangle polarized pattern | Hexagonal polarized pattern |

FIG. 10

Galvano scanner scanning locus

① Divide quadrangle into four

Forward direction

Reverse direction

Step 1 Step 2 Step 3 Step 4 Step 5 Step 6

LASER PROCESSING MACHINE, LASER PROCESSING SYSTEM, ROTATOR UNIT APPARATUS, LASER PROCESSING METHOD, AND METHOD FOR PRODUCING PROBE CARD

CROSS-REFERENCE TO RELATED APPLICATIONS

The present application is based upon and claims the benefit of priority from PCT/JP2021/021744 filed on Jun. 8, 2021, which claims benefit to JP 2020-100120 filed on Jun. 9, 2020.

BACKGROUND

Field

The present disclosure relates to a laser processing machine, a laser processing system, a rotator unit apparatus, a laser processing method, and a method for producing a probe card.

Prior Art

Various materials such as metals, resins, and ceramics are subjected to fine processing using a laser processing machine. For example, JP 2009-233714 discloses a laser processing machine that can reduce the influence of laser reflected beam and perform drilling with high accuracy.

In laser processing, when drilling a workpiece, there is a demand for accuracy of the shape of a hole. For example, as to the shape of the hole, there should be no difference in size and shape at the incident side and the output side of the laser beam, the inner wall of the hole should be straight rather than tapered, and, in the case of a quadrangle hole, the quadrangle hole should have right angle shape corners rather than round corners.

SUMMARY

With the foregoing in mind, it is an to provide a laser processing machine that can perform fine processing of accurate shapes.

In order to achieve the above object, a laser processing machine is provided, the laser processing machine including: a laser oscillating unit; a polarization rotator unit; a beam rotator unit; a condensing optical system; a rotational driving unit; and a controlling unit, wherein the laser oscillating unit can emit a linearly polarized laser beam, the laser beam emitted from the laser oscillating unit can be applied to a workpiece via the polarization rotator unit, the beam rotator unit, and the condensing optical system, the polarization rotator unit includes a wave plate and a first rotation mechanism, the wave plate is intended to change a polarization direction of the laser beam, the first rotation mechanism can rotate the wave plate, the beam rotator unit includes an irradiation angle adjusting optical system and a second rotation mechanism, the irradiation angle adjusting optical system can adjust an irradiation angle of the laser beam to the workpiece by making an incident laser beam eccentric to output and making the laser beam incident on the condensing optical system at a position eccentric from a central axis thereof, the second rotation mechanism can rotate the irradiation angle adjusting optical system, the condensing optical system can condense the laser beam on the workpiece, the rotational driving unit supplies rotational driving force to the first rotation mechanism and the second rotation mechanism, the controlling unit can control a rotational speed ratio between the first rotation mechanism and the second rotation mechanism, and a polarized state of the laser beam can be adjusted by controlling the rotational speed ratio.

Accordingly, the laser processing machine can perform fine processing of accurate shapes.

BRIEF DESCRIPTION OF DRAWINGS

FIG. 3 is a diagram showing an example of the configuration of a beam rotator.

FIG. 4 is an explanatory diagram for explaining the function of the beam rotator.

FIG. 10 is a diagram showing an example of a polarized state of the laser beam in the laser processing machine.

DETAILED DESCRIPTION

Figure 1:
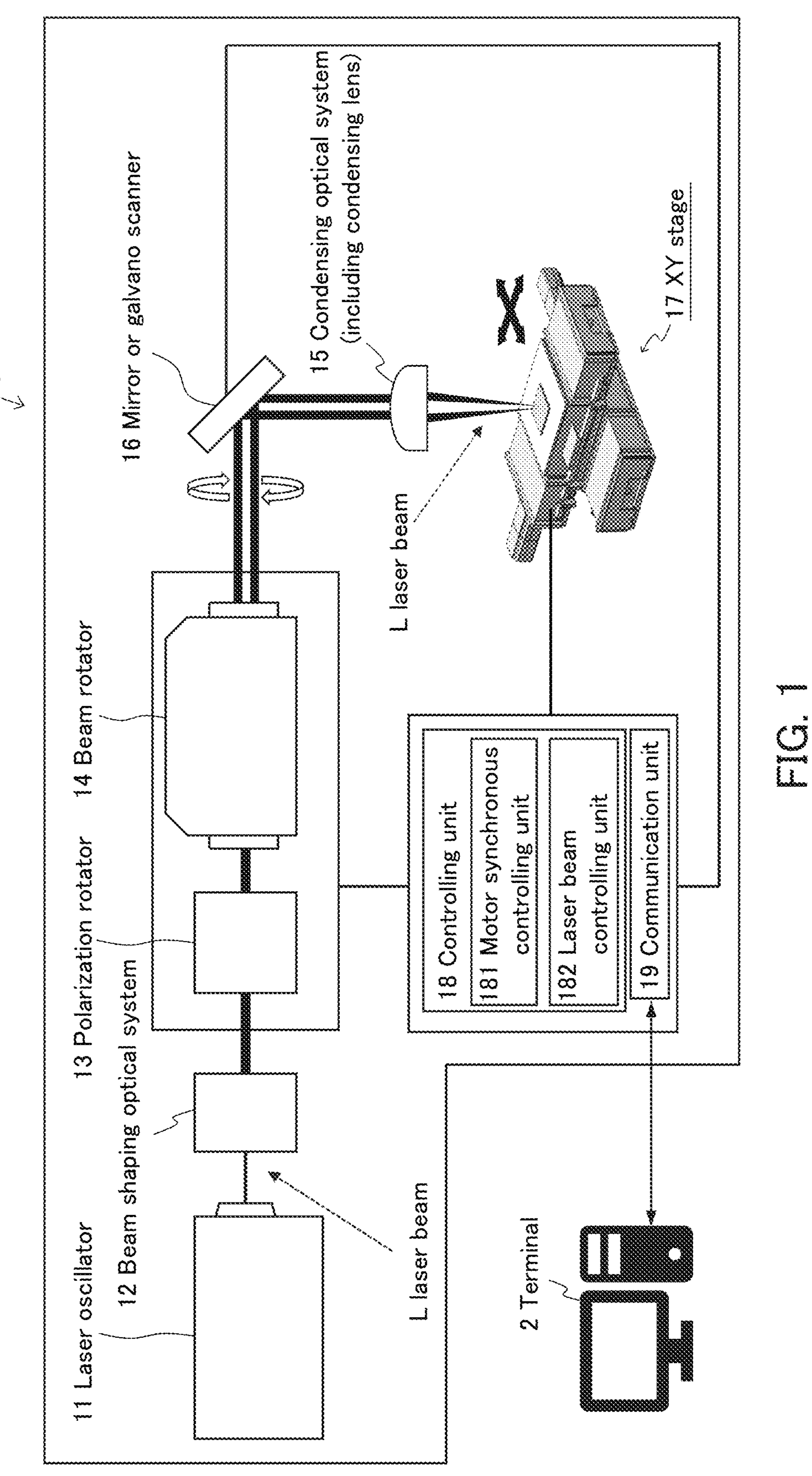
FIG. 1 is a diagram showing an example of the configuration of a laser processing machine.

In an aspect of the machine, the beam rotator unit further may include a rotation radius adjusting optical system, and the rotation radius adjusting optical system tilts an incident laser beam with respect to an incident optical axis, makes the laser beam obliquely incident on the condensing optical system, and annularly scans an irradiation position of the workpiece with the laser beam.

In an aspect of the machine, the rotational driving unit may include a first motor and a second motor that individually supply rotational driving force to the first rotation mechanism and the second rotation mechanism, respectively, and the controller (hereinafter "controlling unit") includes a motor controller (hereinafter "motor controlling unit") that synchronously drive the first and second motors.

In the machine, the wave plate may be, for example, a $\lambda/2$ plate or a $\lambda/4$ plate.

The machine can create a desired polarized pattern (shape) by setting the rotational speed ratio (X:Y) between the rotational speed (X) of the first rotation mechanism and the rotational speed (Y) of the second rotation mechanism to a predetermined value. As described above, the first rotation mechanism can rotate the wave plate included in the polarization rotator unit, and the second rotation mechanism can rotate the irradiation angle adjusting optical system included in the beam rotator unit. Thus, in the following description, "the rotational speed (X) of the first rotation mechanism" is also referred to as "the rotational speed (X) of the polarization rotator", and "the rotational speed (Y) of the second rotation mechanism" is also referred to as "the rotational speed (Y) of the beam rotator". For example, when the shape of the hole to be drilled is a quadrangle, the controlling unit can set the rotational speed ratio (X:Y) to 1.5:1, −0.5:1, or 0.5:1. When the rotational speed ratio (X:Y) is 1.5:1 or −0.5:1, it is possible to make the polarized state of the laser beam a quadrangle polarized pattern. Further, when the rotational speed ratio (X:Y) is 0.5:1, it is possible to make the polarized state of the laser beam a radially polarized pattern. More specifically, it is possible to make the polarized state a radially polarized pattern in which the polarization direction becomes a radiation direction with respect to the locus at any location on a circular locus where the beam rotates. Note that, the rotational speed ratio (X:Y) of plus (+):plus (+) indicates that the rotation directions of the first rotation mechanism and the second rotation mechanism are the same direction, and the rotational speed ratio (X:Y) of minus (−):plus (+) indicates that the rotation directions of the first rotation mechanism and the second rotation mechanism are the opposite directions. Note that plus and minus may be defined freely, and for example, counterclockwise (left-handed) may be defined to be plus, clockwise (right-handed) may be defined to be minus, or vice versa.

In an aspect of the machine, the controlling unit can further control a rotational phase difference between the first rotation mechanism and the second rotation mechanism, a first initial position of the first rotation mechanism may be a rotation angle in which a polarization direction of the laser beam and a fast axis direction of the wave plate coincide, a second initial position of the second rotation mechanism may be a rotation angle in which the polarization direction of the laser beam and a beam eccentric direction of the beam rotator unit coincide, and the rotational phase difference may be a phase difference between the first initial position and the second initial position. As described above, the first rotation mechanism can rotate the wave plate included in the polarization rotator unit, and the second rotation mechanism can rotate the irradiation angle adjusting optical system included in the beam rotator unit. Thus, in the following description, "the rotational phase difference between the first rotation mechanism and the second rotation mechanism" is also referred to as "the rotational phase difference between the wave plate and the beam rotator unit" or "the rotational phase difference between the polarization rotator and the beam rotator", for example. In the case of this aspect, the orientation of the polarized pattern can be changed by changing the rotational phase difference. Specifically, for example, when the polarized state of the laser beam is a radially polarized pattern, the polarized state can be an azimuth polarized pattern by changing the rotational phase difference. Further, when the polarized state of the laser beam is a quadrangle polarized pattern or the like, the orientation of the polarized pattern can be changed by changing the rotational phase difference.

In an aspect of the machine, for example, the frequency of the laser beam may be in the range from 2 kHz to 3 kHz.

In an aspect of the machine, the condensing optical system further may include a galvano scanner, wherein the galvano scanner can scan the workpiece with the laser beam condensed by the condensing optical system.

In an aspect, the machine further may include a processing stage unit, wherein the processing stage unit can be equipped with the workpiece and may be movable in a horizontal direction. In the machine, the processing stage may be movable in the up-and-down direction. The horizontal direction may be, for example, a plane direction perpendicular to the vertical direction, and the up-and-down direction may be, for example, a direction parallel to the vertical direction.

In an aspect of the machine, the controlling unit may include a laser beam controller (hereinafter "laser beam controlling unit"), and the laser beam controlling unit can control at least one of scanning of the laser beam by the galvano scanner and horizontal movement of the processing stage unit.

In an aspect, the machine further may include a communication unit, wherein the communication unit can communicate with a terminal, the communication unit receives control information from the terminal and transmits the control information to the controlling unit, and the controlling unit controls the laser processing machine based on the control information received. Examples of the terminal include a personal computer (PC), a server, a smartphone, and a tablet. The communication may be wired or wireless, may be direct communication between the communication unit and the terminal, or may be communication via a communication network. Examples of the communication network include the Internet, an intranet, and a LAN.

The laser processing system can include a terminal and a laser processing machine, wherein the laser processing machine is any of the laser processing machines discussed above.

The rotator unit apparatus is a rotator unit apparatus for use in the laser processing machine or the laser processing system, including: a polarization rotator unit; a beam rotator unit; a rotational driving unit; and a controlling unit, wherein the polarization rotator unit includes a wave plate and a first rotation mechanism, the wave plate is intended to change a polarization direction of the laser beam, the first rotation mechanism can rotate the wave plate, the beam rotator unit includes an irradiation angle adjusting optical system and a second rotation mechanism, the irradiation angle adjusting optical system can adjust an irradiation angle of the laser beam to the workpiece by making an incident laser beam eccentric to output and making the laser beam incident on the condensing optical system at a position eccentric from a central axis thereof, the second rotation mechanism can rotate the irradiation angle adjusting optical system, the rotational driving unit supplies rotational driving force to the first rotation mechanism and the second rotation mechanism, and the controlling unit can control a rotational speed ratio between the first rotation mechanism and the second rotation mechanism.

In an aspect of the rotator unit apparatus, the beam rotator unit further may include a rotation radius adjusting optical system, and the rotation radius adjusting optical system tilts an incident laser beam with respect to an incident optical axis, makes the laser beam obliquely incident on the condensing optical system, and annularly scans an irradiation position of the workpiece with the laser beam.

In an aspect of the rotator unit apparatus, the rotational driving unit may include a first motor and a second motor that individually supply rotational driving force to the first rotation mechanism and the second rotation mechanism, respectively, and the controlling unit includes a motor controlling unit that synchronously drive the two motors.

The laser processing method is a laser processing method for drilling a quadrangle hole in a workpiece with a laser beam, wherein a grid line in which at least four small quadrangles are formed adjacent to each other inside the quadrangle is assumed, and a scanning locus of the laser beam is a scanning locus traveling each side of the quadrangle and a scanning locus traveling at least a part of the grid line. The laser processing method may be performed using the laser processing machine or the laser processing system, for example.

The method for producing a probe card includes the process of: drilling a hole in a probe card board, wherein the drilling is performed using the laser processing machine or the laser processing system.

Hereinafter, the laser processing machine will be described in detail with reference to the drawings. However, the laser processing machine is not limited to the following description. In the following FIGS. 1 to 17, identical parts are indicated with identical reference signs, and the descriptions of the identical parts may be omitted. Furthermore, in the drawings, for ease of description, illustration of the structures of the components may be simplified as appropriate, and the ratio of sizes of components and the like may be schematically indicated contrary to reality.

First Embodiment

FIG. 1 shows an example of a laser processing machine 1. As shown in FIG. 1, the laser processing machine 1 of this example comprises a laser oscillating unit (laser oscillator) 11, a beam shaping optical system 12, a polarization rotator unit (polarization rotator) 13, a beam rotator unit (beam rotator) 14, a reflecting mirror (which may be able to scan by a galvano mechanism (not shown)) 16, a condensing lens 15 which is a condensing optical system, a processing stage (XY stage) 17, a controlling unit 18, a communication unit 19, and a rotational driving unit (not shown in FIG. 1). Note that, the beam shaping optical system 12, the reflecting mirror 16, the processing stage 17, and the communication unit 19 are optional, and the laser processing machine 1 may or may not include them, for example. The laser oscillator 11 is a solid-state laser or a fiber laser beam source, and can be a pulsed laser. The laser oscillator 11 emits the laser beam, which is linearly polarized beam, the emitted laser beam is applied to a workpiece mounted on the processing stage unit 17 via the beam shaping optical system 12, the polarization rotator 13, the beam rotator 14, the reflecting mirror 16, and the condensing optical system 15. The controlling unit 18 includes, for example, a motor synchronous controlling unit 181 and a laser beam controlling unit 182. The controlling unit, motor synchronous controlling unit 181 and laser beam controlling unit 182 can comprise hardware, such as a CPU, computer or one or more circuits or a combination of hardware and software. The controlling unit 18, motor synchronous controlling unit 181 and laser beam controlling unit 182 may be implemented as separate controllers or a single controller. The motor synchronous controlling unit 181 synchronously controls the rotation of the first rotation mechanism of the polarization rotator 13 and the rotation of the second rotation mechanism of the beam rotator. The rotational driving unit supplies rotational driving force to the first rotation mechanism and the second rotation mechanism. The rotational driving unit may be, for example, a motor (servo motor). Further, the laser beam controlling unit 182 controls at least one of the galvano scanner 16 and the processing stage 17, and controls the scanning locus of the laser beam with respect to the workpiece. The communication unit 19 can communicate with a terminal 2, the control information from the terminal 2 is transmitted to the controlling unit 18 via the communication unit 19, and the motor synchronous controlling unit 181 and the laser beam controlling unit 182 control the components of the laser processing machine 1 such as the polarization rotator 13, the beam rotator 14, the reflecting mirror 16, the processing stage 17, the rotational driving unit, and the like using the control information.

Figure 2:
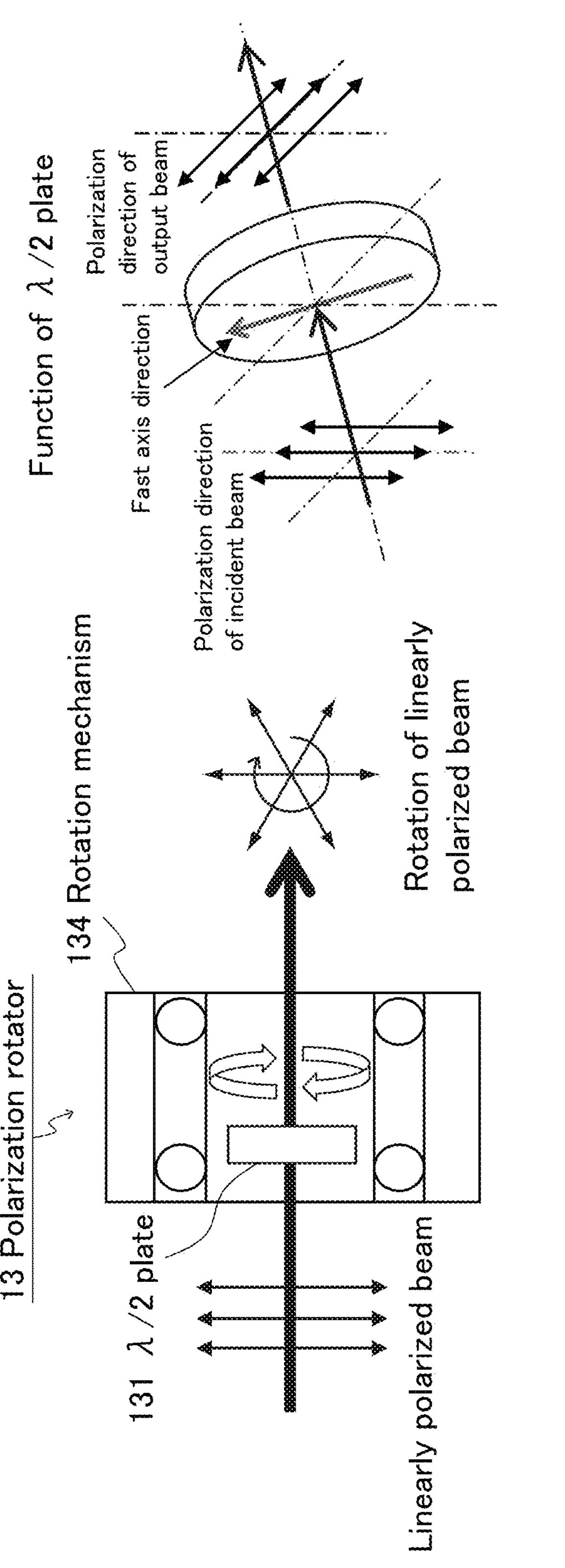
FIG. 2 is a diagram showing an example of the configuration of a polarization rotator.

FIG. 2 shows the configuration and function of the polarization rotator 13. As shown in FIG. 2, a wave plate such as a λ/2 plate 131 is disposed in the polarization rotator 13, and the wave plate (λ/2 plate 131) is rotatable by a first rotation mechanism 134. While the laser beam emitted from the laser oscillator 11 and shaped by the beam shaping optical system 12 is in a linearly polarized state, by passing the rotating λ/2 plate 131, the polarization direction of the linearly polarized beam rotates.

Figure 3:
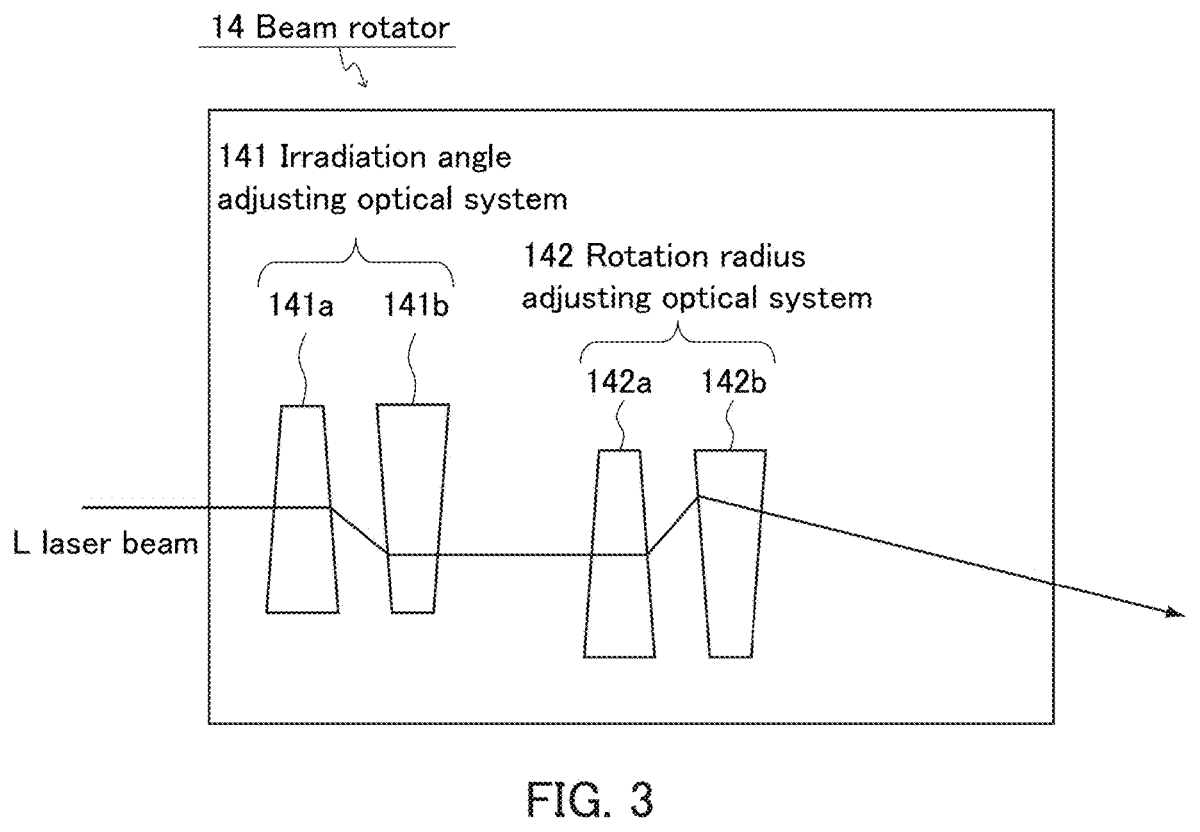

FIG. 3 shows an example of the configuration of the beam rotator 14. As shown in FIG. 3, the beam rotator 14 comprises an irradiation angle adjusting optical system 141 and a rotation radius adjusting optical system 142. The irradiation angle adjusting optical system 141 comprises a pair of prisms 141*a* and 141*b*, and makes the incident laser beam L eccentric with respect to the incident optical axis. Thus, the laser beam L is made incident on the condensing lens 15 at a position eccentric from the center axis of the condensing lens 15, thereby adjusting the irradiation angle of the laser beam L applied to the workpiece. The rotation radius adjusting optical system 142, which comprises a pair of prisms 142*a* and 142*b*, tilts the laser beam L incident on the beam rotator 14 with respect to the incident optical axis to output the laser beam L to the condensing lens 15 via the reflecting mirror 16. The laser beam L tilted by the rotation radius adjusting optical system 142 and incident on the condensing lens 15 is annularly output to the workpiece.

Figures 5A, 5B, 5C, 5D:
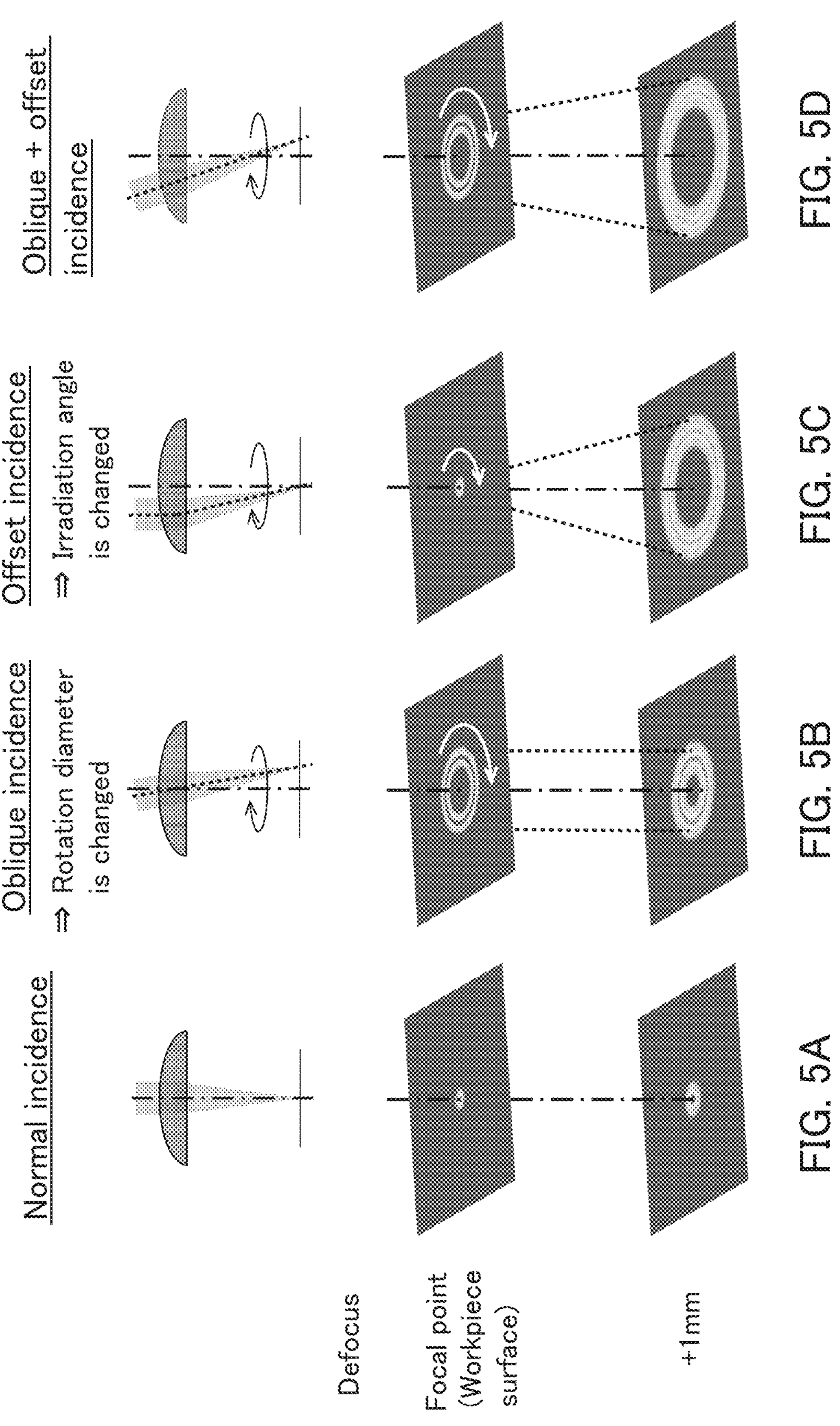
FIGS. 5A to 5D are explanatory diagrams for explaining the function of the beam rotator.

As shown in FIG. 4, the beam rotator 14 has three functions, namely, (1) tilt of the beam, (2) offset of the beam, and (3) rotation of the beam. The functions (1), (2), and (3) will be described with reference to FIGS. 5A-5D. FIGS. 5A-5D show the behavior of the processing point beam by the operation of the beam rotator 14. FIGS. 5A-5D show the behavior of the processing point beam at two points, namely, the focal point on the workpiece, and the position 1 mm output side than the focal point. In FIGS. 5A-5D, the central axis of the lens is indicated by a chain line and the traveling path of the laser is indicated by a dotted line. FIG. 5A shows the case where the beam rotator is not used (normal incidence), FIG. 5B shows the case where the beam is tilted and made incident on the lens obliquely with respect to the central axis of the lens (oblique incidence), FIG. 5C shows the case where the beam is made incident on the lens by offsetting with respect to the central axis of the lens (offset incidence), and FIG. 5D shows the case where the beam is tilted and made incident on the lens by offsetting with respect to the central axis of the lens (oblique+offset incidence). In the case of the normal incidence, as shown in FIG. 5A, the beam always travels on the central axis of the lens. In the case of the oblique incidence, as shown in FIG. 5B, the beam passes a location that deviates from the central axis of the lens at either the focal point and the defocus position.

Therefore, when the beam rotator 14 is rotated in a state of oblique incidence, the beam forms a circular locus. Note that, FIG. 5B schematically shows an example of the tilt angle of the beam, and the tilt angle of the beam may be a slight tilt angle less than 1 degree, for example. In the case of the offset incidence, as shown in FIG. 5C, the beam to be condensed travels while approaching the central axis of the lens at a constant angle, and travels while moving away from the central axis of the lens after intersecting with the central axis of the lens at the focal point. Therefore, when the beam rotator 14 is rotated in a state of offset incidence, the beam at the focal point is not different from the case of normal incidence, but the defocused beam forms a circular locus. When combining the oblique incidence and offset incidence, as shown in FIG. 5D, the rotation diameter of the beam at the focal point can be changed by changing the tilt angle of the beam incident on the lens, the irradiation angle of the rotating beam applied to the work can be changed by changing the offset amount of the beam.

Figure 6:
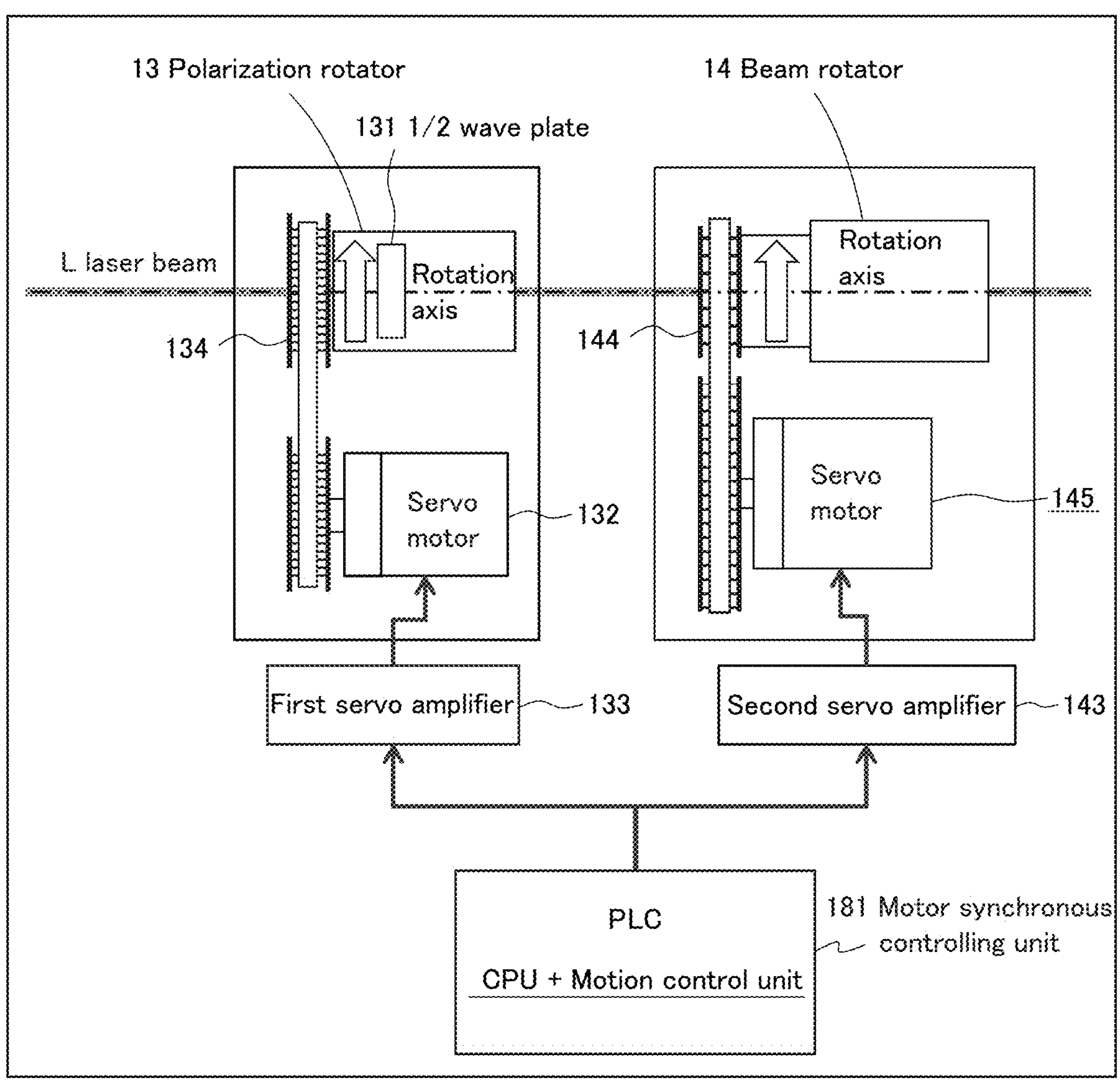
FIG. 6 is a diagram showing an example of synchronous control.

FIG. 6 shows the synchronization control of the polarization rotator 13 and the beam rotator 14. As shown in FIG. 6, the motor synchronous controlling unit 181 comprises a programmable logic controller (PLC), the PLC comprises a central processing unit (CPU) and a motion controlling unit. The first rotational driving unit (also referred to as a first actuator, such as a first servo motor) 132 of the polarization rotator 13 is connected to the first servo amplifier 133 and the first rotation mechanism 134, the second rotational driving unit (also referred to as a second actuator, such as a second servo motor) 145 of the beam rotator 14 is connected to the second servo amplifier 143 and the second rotation mechanism 144. A control signal is transmitted from the PLC to the first servo amplifier 133 and the second servo amplifier 143, and the rotational speed and the rotational phase difference between the first servo motor 132 and the second servo motor 145 is controlled. Note that, the polarization rotator 13 and the beam rotator 14 are not limited to those driven by separate motors individually, and may be those driven by a single motor, for example, those driven by two rotational driving units having a gear structure.

Figure 7:
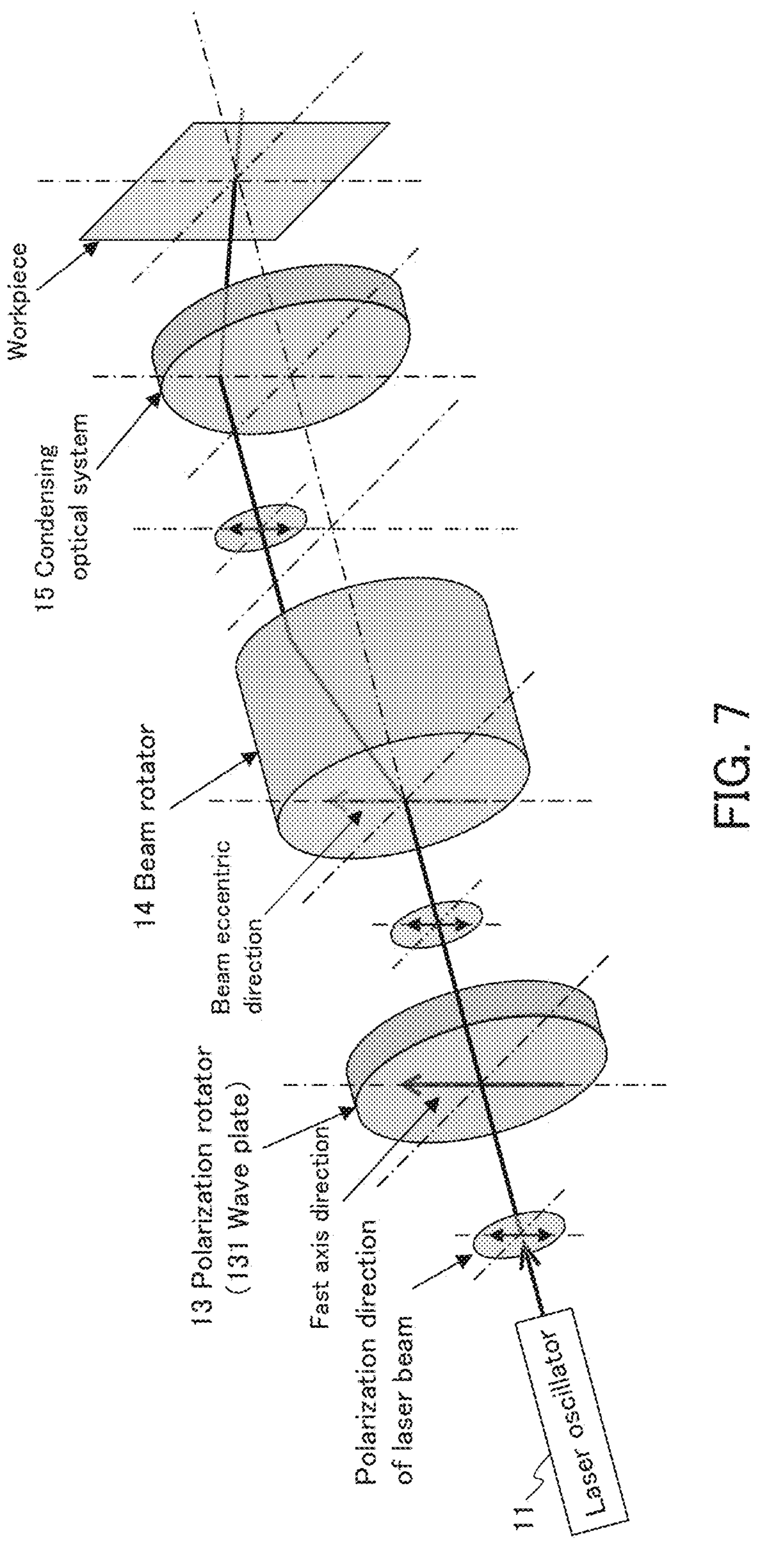
FIG. 7 is an explanatory diagram for explaining the control of a phase difference.

The control of the rotational phase difference between the polarization rotator 13 and the beam rotator 14 in the laser processing machine will be described with reference to FIG. 7. For example, the first initial position (0 degrees) of the wave plate 131 is defined to be the rotation angle in which the polarization direction of the laser beam and the fast axis direction of the wave plate 131 coincide. The second initial position (0 degrees) of the beam rotator 14 is defined to be the rotation angle in which the polarization direction of the laser beam and the beam eccentric direction of the beam rotator 14 coincide. The rotational phase difference is defined to be a phase difference between the first initial position and the second initial position. Note that, the definition of the rotational phase difference is not limited to the above definition, and the rotational phase difference may be defined differently. The relationship among the rotation angle (θPR) of the polarization rotator 13, the rotation angle (θBR) of the beam rotator 14, the rotational speed ratio (X:Y) between the polarization rotator 13 and the beam rotator 14, and the rotational phase difference (θ0) can be represented by the following mathematic equation. In the laser processing machine, for example, the phase difference between the polarization rotator 13 and the beam rotator 14 may be reset to "0" degrees when the power of the machine is turned on or off, or before starting the rotation operation.

$$\theta PR = \theta BR \times X/Y + \theta 0$$

Figure 8:
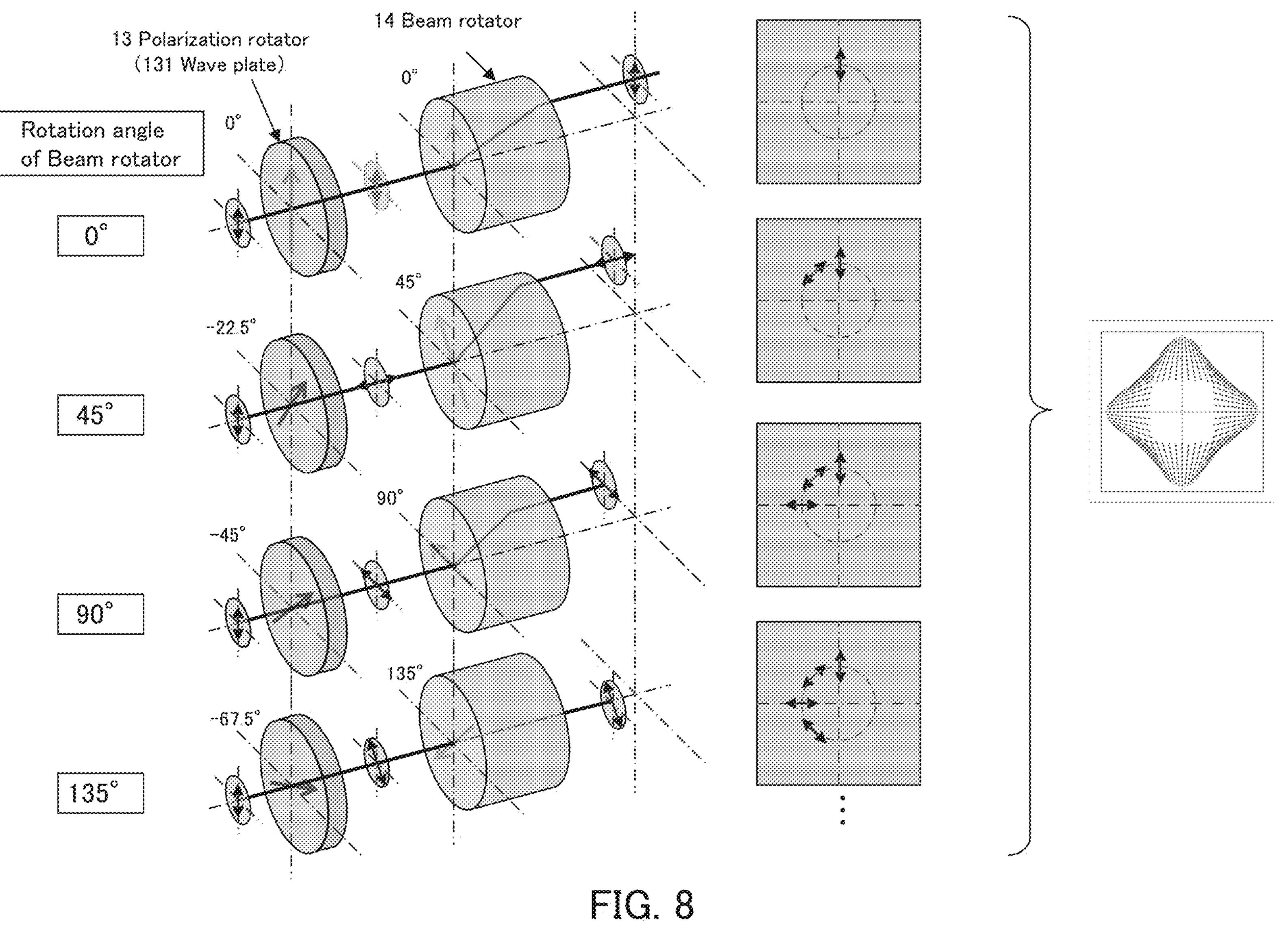
FIG. 8 is an explanatory diagram for explaining the control of the phase difference.

FIG. 8 shows the relationship between the fast axis direction of the wave plate 131 and the beam eccentric direction of the beam rotator 14 when the rotational speed ratio (X:Y) between the rotational speed (X) of the polarization rotator 13 (wave plate 131, λ/2 plate) and the rotational speed (Y) of the beam rotator 14 is set to −0.5:1 and the rotational phase difference (degree) is controlled to "0" degrees. Note that, the polarized state of the laser beam in this case is a quadrangle polarized pattern having a rhombic shape, as shown on the right side of FIG. 8. The following rotation angles are the angles of the wave plate 131 in the fast axis direction and the angles of the beam rotator 14 in the beam eccentric direction. First, when the rotation angle of the beam rotator 14 is 0 degrees, the rotation angle of the wave plate 131 is also 0 degrees. When the beam rotator 14 rotates counterclockwise (left-handed) to a rotation angle of 45 degrees, the wave plate 131 rotates clockwise (right-handed) to a rotation angle of −22.5 degrees. When the angle difference between the fast axis direction of the λ/2 plate and the polarization direction of the incident beam is θ, the polarization direction of the beam transmitted through the λ/2 plate becomes 2θ. Therefore, the polarization direction of the beam when the rotation angle of the wave plate is −22.5 degrees becomes −45 degrees, which is the direction perpendicular to the eccentric direction of the beam rotator 14. When the beam rotator 14 rotates counterclockwise (left-handed) to a rotation angle of 90 degrees, the wave plate 131 rotates clockwise (right-handed) to a rotation angle of −45 degrees, and the polarization direction of the beam at this time becomes −90 degrees. When the beam rotator 14 rotates counterclockwise (left-handed) to a rotation angle of 135 degrees, the wave plate 131 rotates clockwise (right-handed) to a rotation angle of −67.5 degrees, and the polarization direction of the beam at this time is −135 degrees. Thus, by making the beam to be in a specific polarization direction with respect to the angles to be rotated, it is possible to form a quadrangle polarized pattern having a rhombic shape with the entire rotating beam.

Figure 9:
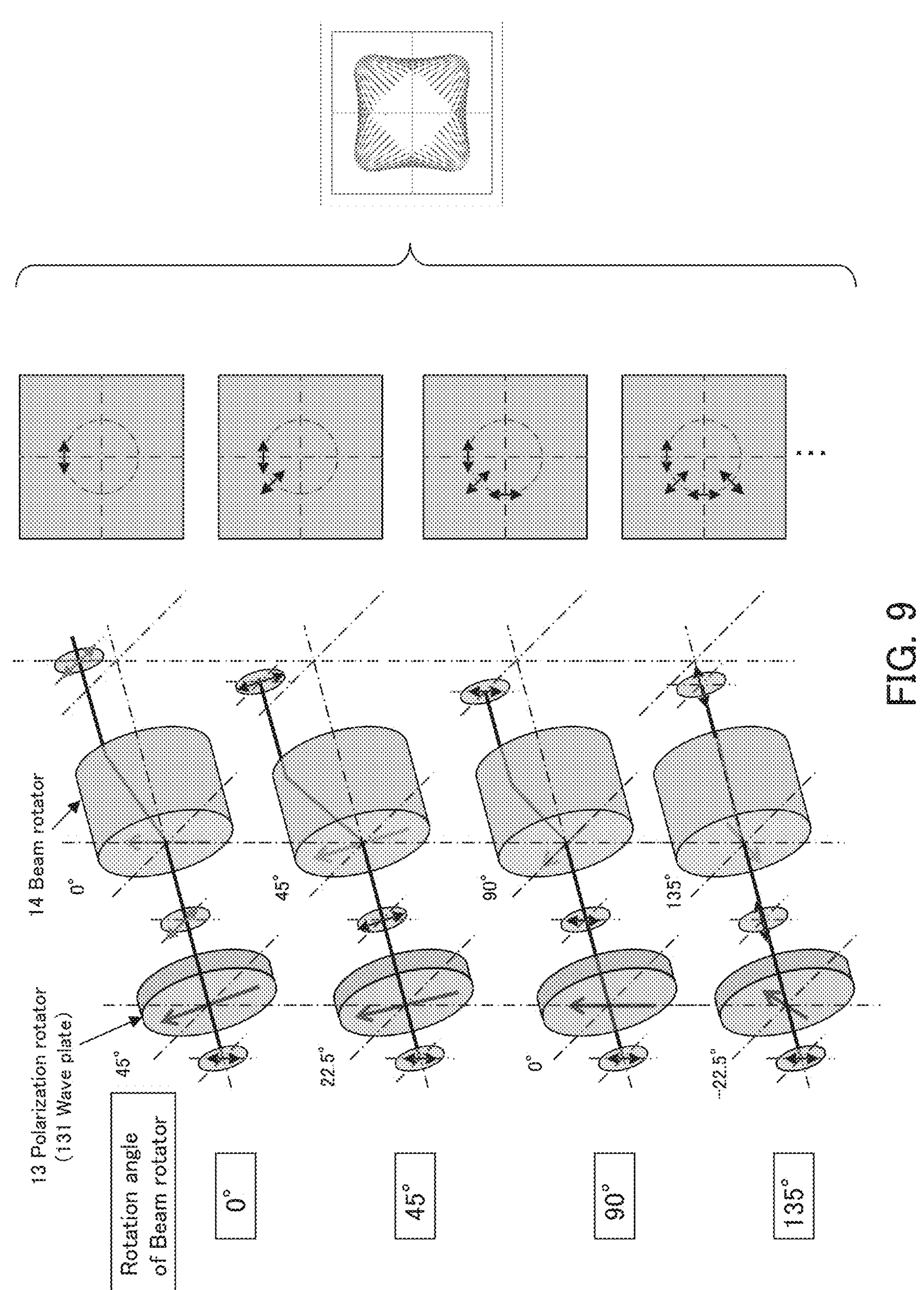
FIG. 9 is an explanatory diagram for explaining the control of the phase difference.

FIG. 9 shows the relationship between the fast axis direction of the wave plate 131 and the beam eccentric direction of the beam rotator 14 when the rotational speed ratio (X:Y) between the rotational speed (X) of the polarization rotator 13 (wave plate 131, λ/2 plate) and the rotational speed (Y) of the beam rotator 14 is set to −0.5:1 and the rotational phase difference (degree) is controlled to "45" degrees. Note that, the polarized state of the laser beam in this case is a quadrangle polarized pattern having a square shape, as shown on the right side of FIG. 9. The following rotation angles are the angles of the wave plate 131 in the fast axis direction and the angles of the beam rotator 14 in the beam eccentric direction. First, when the rotation angle of the beam rotator 14 is 0 degrees, the rotation angle of the wave plate 131 is 45 degrees, and the polarization direction of the beam at this time becomes 90 degrees. When the beam rotator 14 rotates counterclockwise (left-handed) to a rotation angle of 45 degrees, the wave plate 131 rotates clockwise (right-handed) to a rotation angle of 22.5 degrees, and the polarization direction of the beam at this time becomes 45 degrees. When the beam rotator 14 rotates counterclockwise (left-handed) to a rotation angle of 90 degrees, the wave plate 131 rotates clockwise (right-handed) to a rotation angle of 0 degrees, and the polarization direction of the beam at this time also becomes 0 degrees. When the beam rotator 14 rotates counterclockwise (left-handed) to a rotation angle of 135 degrees, the wave plate 131 rotates clockwise (right-handed) to a rotation angle of −22.5 degrees, and the polarization direction of the beam at this time is −45 degrees. Thus, by giving the rotational phase difference, the polarized pattern in a rhombic direction (45 degrees) in FIG. 8 can be rotated to be a quadrangle polarized pattern having a square shape.

FIG. 10 shows the polarized states of the laser beam when the rotational speed ratio (X:Y) and the rotational phase difference (degree) between the rotational speed (X) of the polarization rotator 13 (wave plate 131, λ/2 plate) and the rotational speed (Y) of the beam rotator 14 are controlled. First, when the rotational speed ratio is 0.5:1, the polarized pattern is a radially polarized pattern with the rotational phase difference of 0 degrees, and the polarized pattern is an azimuth polarized pattern with the rotational phase difference of 45 degrees. When the rotational speed ratio is 0:1, the beam is a linearly polarized pattern (horizontal) with the rotational phase difference of 0 degrees and the beam is a linearly polarized pattern (vertical) with the rotational phase difference of 45 degrees. When the rotational speed ratio is −0.5:1, the polarized pattern is a quadrangle polarized pattern having a rhombic shape with the rotational phase difference of 0 degrees, and the polarized pattern is a quadrangle polarized pattern having a square shape with the rotational phase difference of 45 degrees. When the rotational speed ratio is −1:1, the polarized pattern is a hexagonal polarized pattern having vertexes on the left and right with the rotational phase difference of 0 degrees, and the polarized pattern is the hexagonal polarized pattern having vertexes on the top and bottom with the rotational phase difference of 45 degrees. Note that, the polarized states shown in FIG. 10 are examples and, by changing the rotational speed ratio and the rotational phase difference between the polarization rotator 13 and the beam rotator 14, the laser beam can be in various polarized states.

Second Embodiment

Next, an operation of drilling a quadrangle hole using the laser processing machine 1 of the first embodiment will be described. First, the rotational speed ratio (X:Y) between the rotational speed (X) of the polarization rotator 13 and the rotational speed (Y) of the beam rotator 14 is set to 5:1 or −0.5:1.

Figure 11:
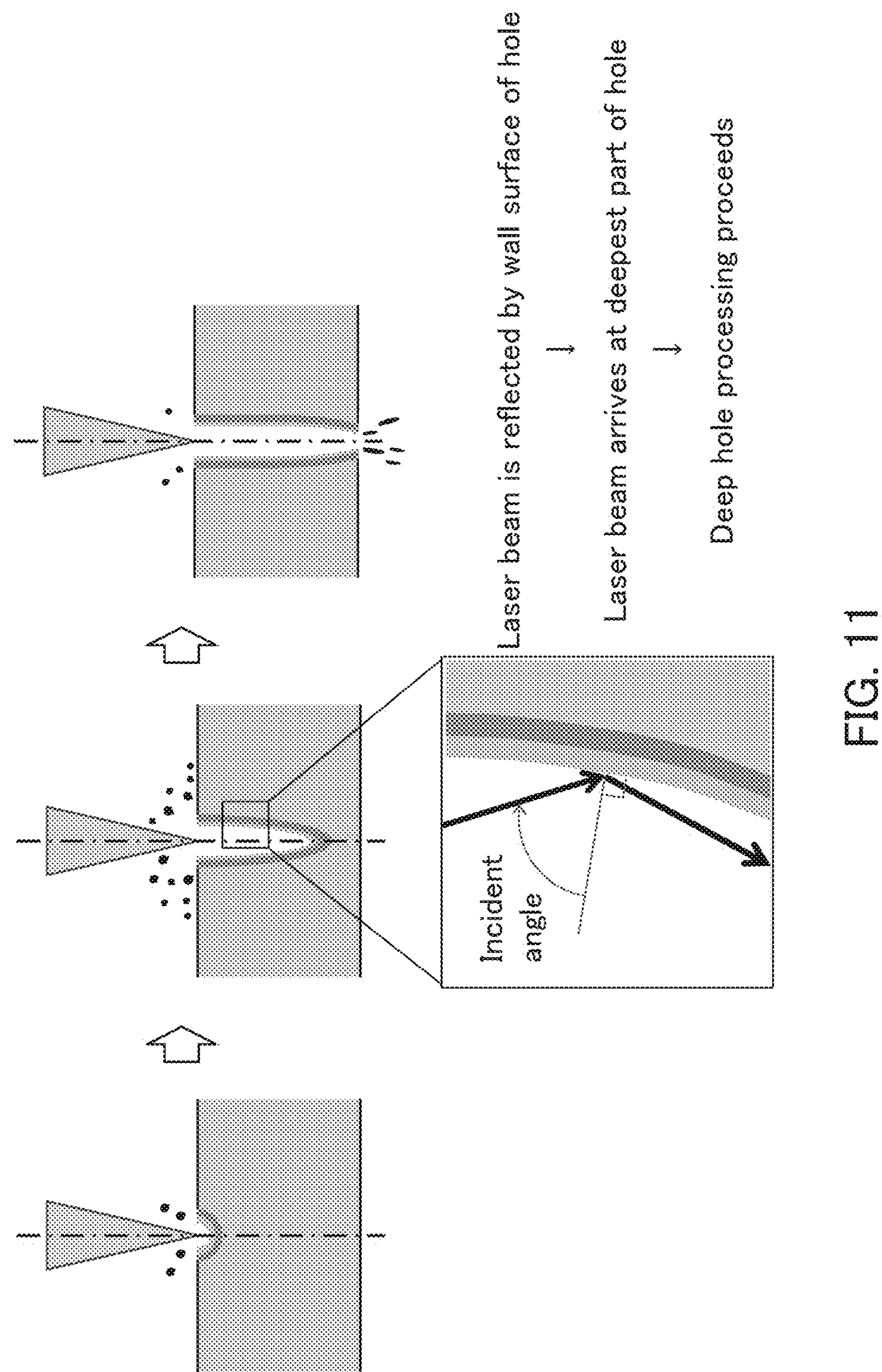
FIG. 11 is an explanatory diagram for explaining the principle of laser processing.
Figure 12:
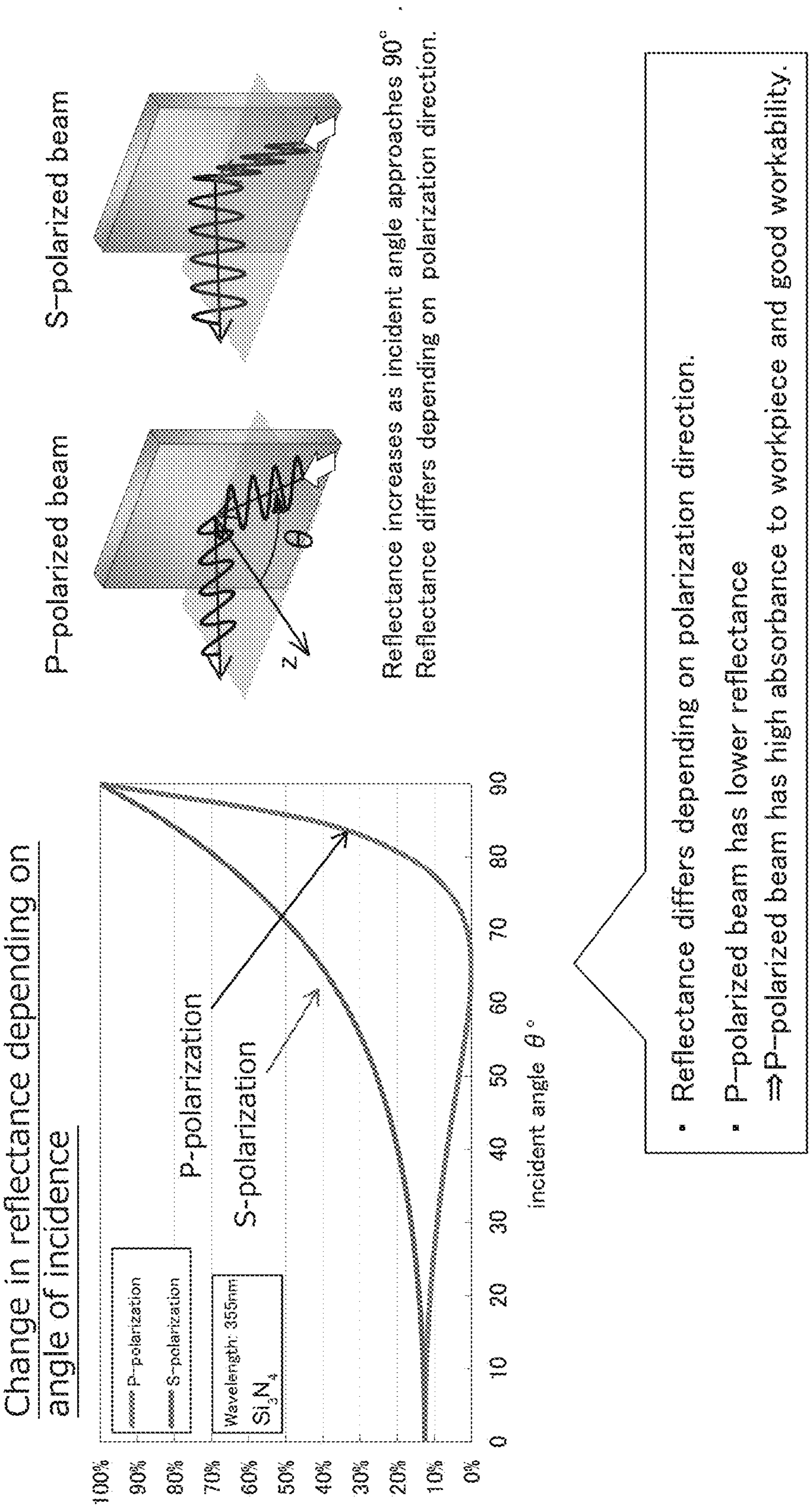
FIG. 12 is an explanatory diagram for explaining the difference in absorbance depending on the difference in the types of polarized beam.

The physical principle of drilling by the laser beam will be described with reference to FIGS. 11 and 12. As shown in FIG. 11, when drilling a hole in a workpiece with a laser, the front surface is directly irradiated with the laser beam (incident angle is about 0 degrees) and the energy is efficiently absorbed by the workpiece, thereby forming a hole. On the other hand, as drilling toward the back surface, the laser beam travels to the deep part while being reflected by the wall surface of the hole. Specifically, in the initial stage of applying the laser beam, the incident angle is approximately 0 degrees because the surface of the workpiece is flat, but as the formation of a hole proceeds, the laser beam is applied to the inner wall of the hole. Therefore, the incident angle of the laser beam with respect to the surface of the workpiece is increased. Then, a part of the laser beam applied to the inner wall of the hole is reflected and travels to the deep part to form a deep hole. As shown in FIG. 12, the reflectance of the laser beam incident obliquely as described above differs greatly between P-polarization and S-polarization. As compared to the S-polarized beam, the P-polarized beam has low reflectance and high absorbance to the workpiece. On the basis of this principle, by using the laser beam of the quadrangle polarized pattern with the P-polarized beam at four corners and the S-polarized beam at the linear parts, processing of the four corners is promoted, and an edgy quadrangle hole can be formed even in the deep part of the hole and the back surface. Thus, when a quadrangle hole is formed using the laser beam of the quadrangle polarized pattern by focusing on the fact that the absorbance of the P-polarized beam to the workpiece is good, the frequency of the laser beam can be increased in order to increase the polarization effect. The frequency is, for example, from 2 kHz to 3 KHz, such as around 2.5 kHz. An edgy quadrangle hole can be formed even in the deep part of the hole and the back surface, for example, by setting the frequency in the range described above.

Figures 13A, 13B:
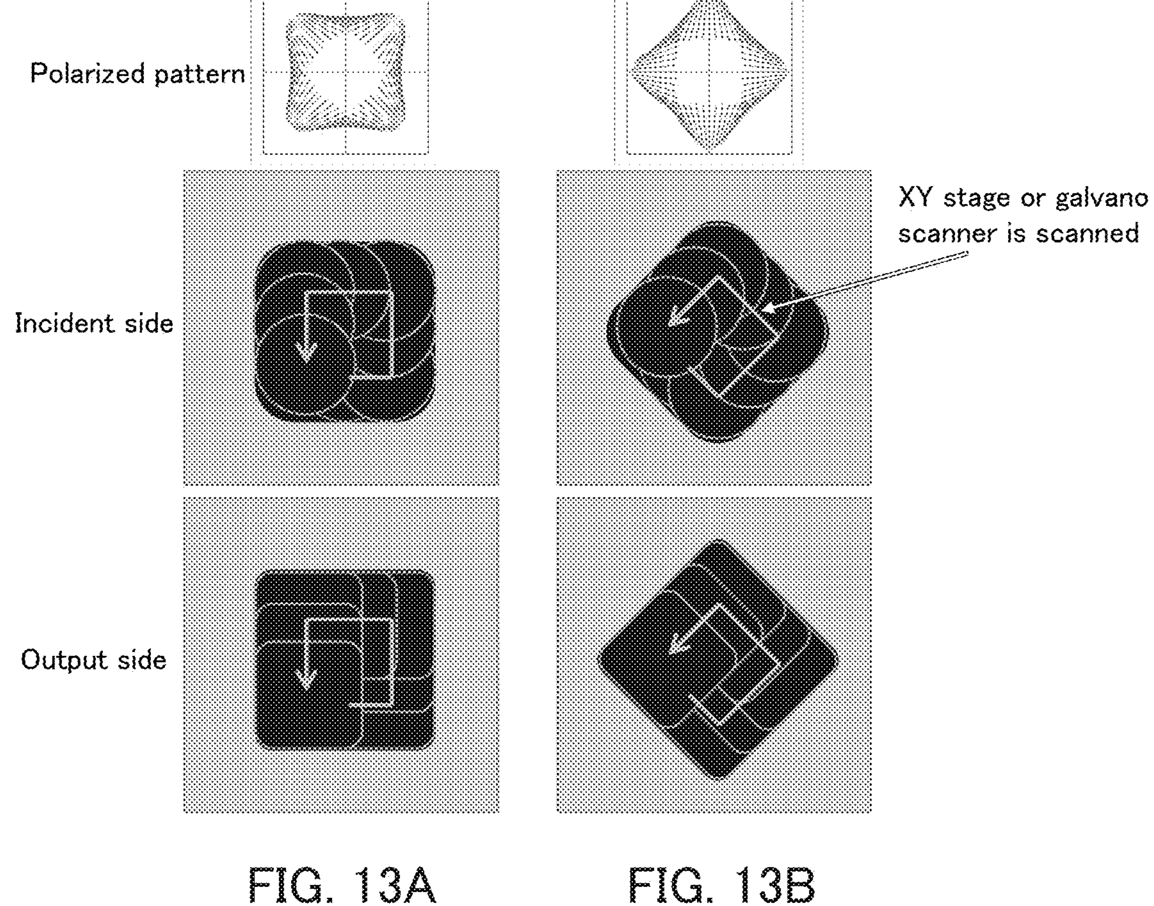
FIGS. 13A and 13B are diagrams showing an example of drilling a quadrangle hole by laser processing.

FIGS. 13A and 13B show an example of a polarized pattern and a scanning locus in the case of forming a quadrangle hole in a workpiece. In each of FIGS. 13A and 13B, the upper drawing shows a polarized pattern, the middle drawing shows an example of a scanning locus on the incident side, and the lower drawing shows an example of a scanning locus on the output side. In the case of drilling a quadrangle hole as shown in the middle and lower drawings in FIG. 13A, first, the rotational phase difference at the initial position described above is set to 45 degrees. In the case of drilling a square hole, the orientation of which is rotated clockwise 45 degrees, as shown in the middle and lower drawings in FIG. 13B, for example, the rotational phase difference is set to 0 degrees at the initial position. Then, the surface of the workpiece is scanned in the square shape along the orientation of the respective polarized patterns with the laser beam of these polarized patterns using the galvano scanner or XY stage. Conventional polarization rotator and the beam rotator drill with a laser beam having a random polarization direction without rotating synchronously so that the linearly polarized beam does not affect the drilling. On the other hand, in the present embodiment, the same hole shape as the locus scanned on the front surface of the workpiece (focal plane of the laser beam) can be formed on the back surface of the workpiece (output surface of the laser beam) by setting the rotational speed ratio to −0.5:1 and making the polarized pattern a quadrangle shape.

Figure 14:
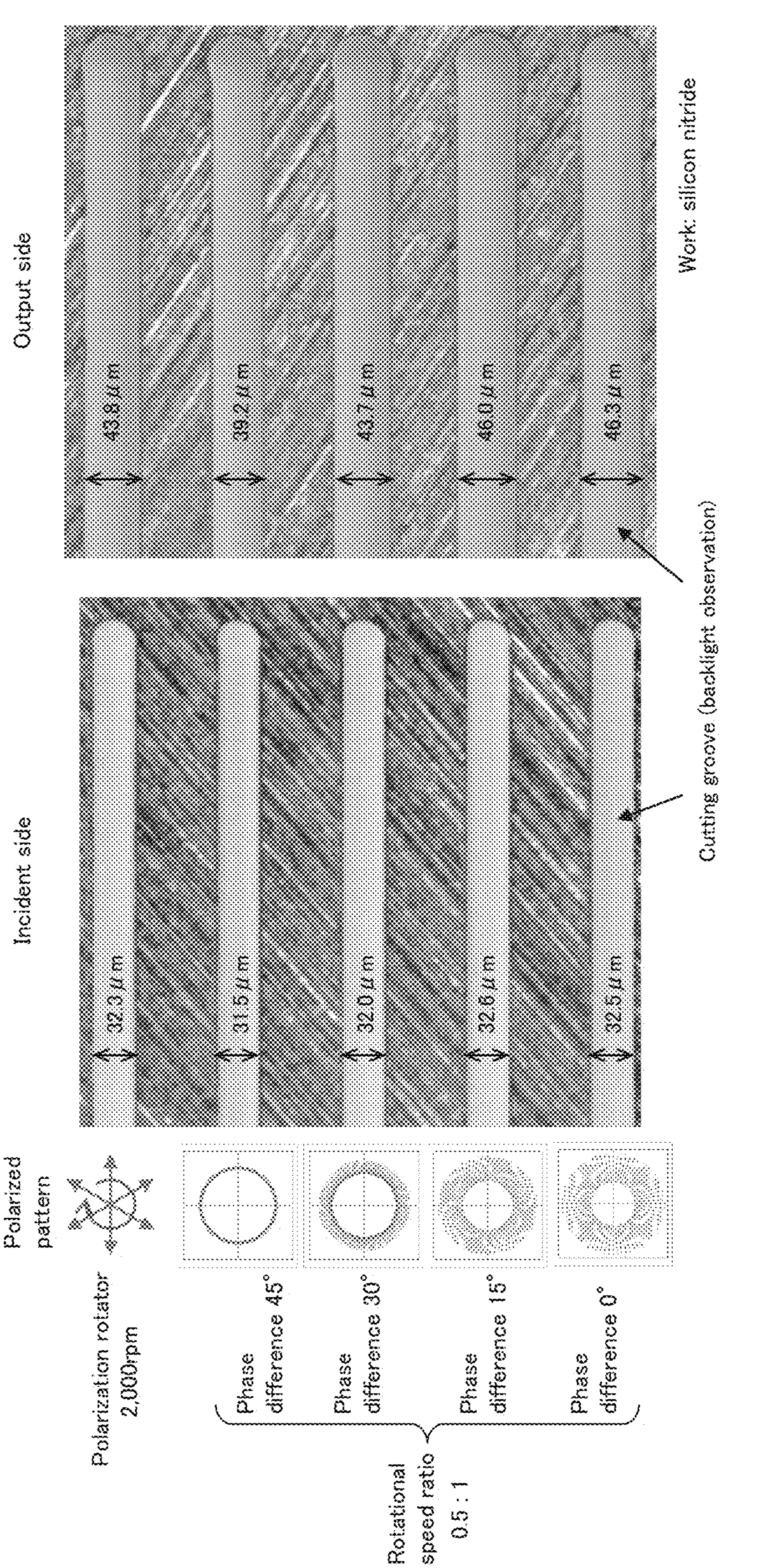
FIG. 14 is a diagram showing cutting processing states depending on the difference in a polarized pattern.

In the laser processing machine 1 of the first embodiment, the radially polarized pattern formed when the rotational speed ratio (X:Y) between the polarization rotator 13 and the beam rotator 14 is set to 0.5:1 and the rotational phase difference is set to 0 degrees can process a workpiece efficiently as described with reference to FIGS. 11 and 12. FIG. 14 shows the result of forming a cutting groove in a silicon nitride plate material (thickness: 0.25 millimeters) with the rotational speed ratio (X:Y) of 0.5:1 and the phase difference from 0 degrees to 45 degrees. Thus, the user can easily select a polarized pattern optimal to the workpiece by operating the terminal 2 to set the rotational speed ratio and phase difference to desired values by the motor synchronous controlling unit 181, for example. As a result, it is possible to form edgy quadrangle holes or edgy hexagonal holes in the workpiece, or to perform processing with high energy efficiency, that is, high processing speed.

Figure 15:
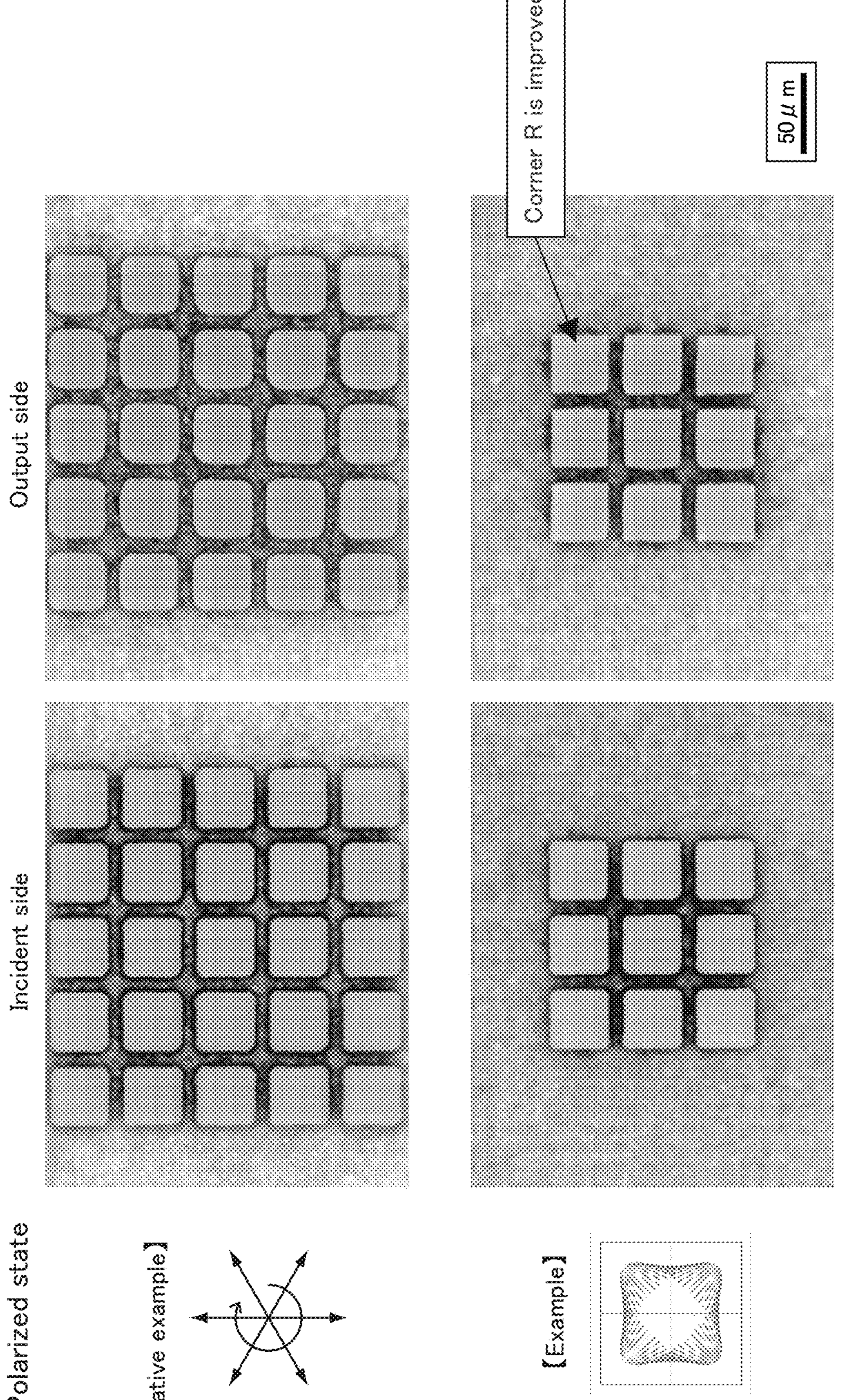
FIG. 15 shows photographs of laser processing states according to Example and photographs showing laser processing states according to Comparative Example.

FIG. 15 shows, as Example, a case of the laser processing of silicon nitride using the laser processing machine 1 of the first embodiment with the rotational speed ratio between the polarization rotator 13 and the beam rotator 14 (X:Y) of −0.5:1 and the rotational phase difference between the polarization rotator 13 and the beam rotator 14 of 45 degrees. Further, FIG. 15 shows, as Comparative Example, a case of the laser processing in a random pattern using a conventional laser processing machine by rotating linearly polarized beam irrespective of the beam rotator. The upper photos of FIG. 15 show the processing state of Comparative Example, the lower photos of FIG. 15 show the processing state of Example, the photos on the left side of FIG. 15 show the processing state on the laser incident side, and the photos on the right side of FIG. 15 show the processing state on the laser output side. As shown in FIG. 15, in Example, quadrangle holes with four right angle corners can be drilled on both the laser incident side and the laser output side. In contrast, in Comparative Example, quadrangle holes with four round corners are formed, and quadrangle holes in particular on the laser output side have more round corners. In the same principle, when drilling hexagonal holes, edgy hexagonal holes can be drilled by setting the rotational speed ratio to 2:1, creating a laser beam of the hexagonal polarized pattern shown in FIG. 10, and scanning in the shape of the hexagon with the laser beam. Further, for example, efficiency of creating round holes, cutting, and grooving is improved by making the laser beam a radially polarized pattern.

Third Embodiment

Figure 16:
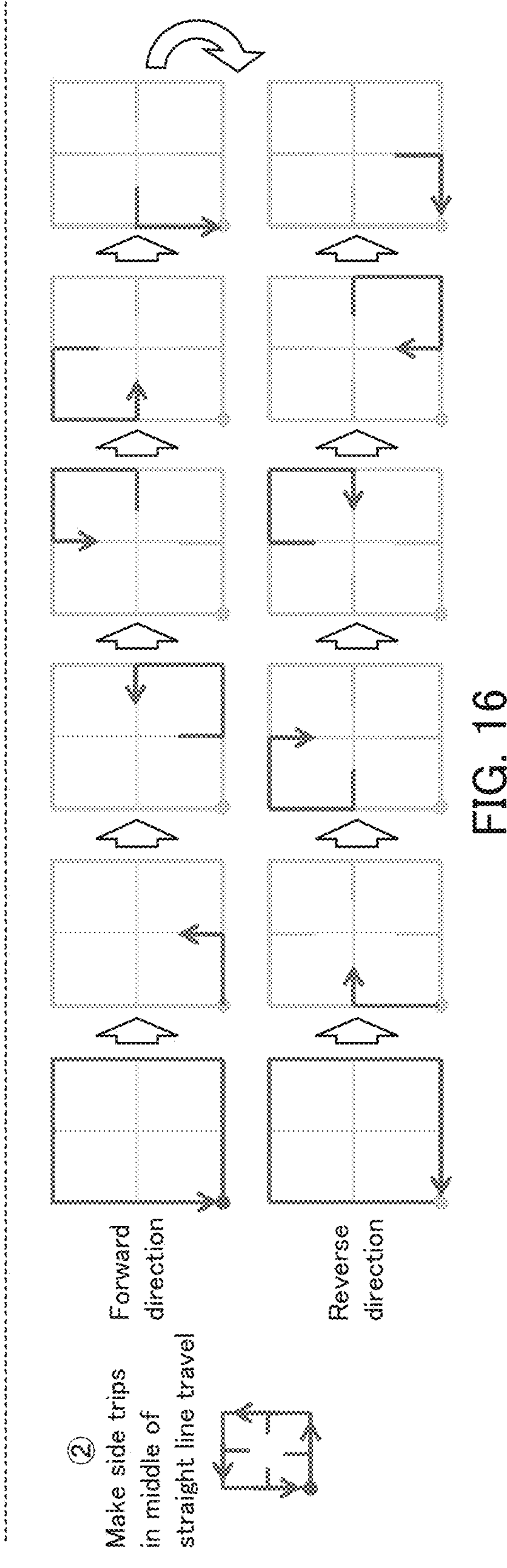
FIG. 16 is a diagram for explaining scanning loci of a galvano scanner.

FIG. 16 shows an example of a galvano scanner scanning locus in the laser processing method. The laser processing method is a laser processing method for drilling a quadrangle hole in a workpiece with a laser beam, wherein a grid line in which four small quadrangles are formed adjacent to each other inside the quadrangle is assumed, and a scanning locus of the laser beam is a scanning locus traveling each side of the quadrangle and a scanning locus traveling at least a part of the grid line. In the method, the scanning locus includes a first scanning locus and a second scanning locus described below.

The scanning locus shown on the upper side of FIG. 16 is a first scanning locus, which is a method of dividing a quadrangle hole to be drilled into four.

First, with the quadrangle as a large quadrangle, a grid line in which four small quadrangles are formed adjacent to each other inside the large quadrangle is assumed. Then, in step 1, the four sides of the large quadrangle are scanned in the forward direction (counterclockwise direction) with the lower left corner of the large quadrangle as a start point and an end point.

In step 2, the four sides of the small quadrangles are scanned in the forward direction with the lower left corner of the lower left quadrangle as a start point and an end point.

In step 3, the four sides of the small quadrangles are scanned in the forward direction with the lower left corner of the lower left small quadrangle as a start point and the lower left corner of the lower right small quadrangle as an end point.

In step 4, the four sides of the small quadrangles are scanned in the forward direction with the lower left corner of the lower right small quadrangle as a start point and the lower right corner of the upper right small quadrangle as an end point.

In step 5, the four sides of the small quadrangles are scanned in the forward direction with the lower right corner of the upper right small quadrangle as a start point and the upper right corner of the upper left small quadrangle as an end point.

In step 6, the upper side and the left side of the large quadrangle are scanned in the forward direction with the upper right corner of the upper left small quadrangle as a start point and the lower left corner of the lower left small quadrangle as an end point.

Next, steps 1 to 6 are performed in the reverse direction (clockwise direction).

Next, the scanning locus shown on the lower side of FIG. 16 is a second scanning locus, which is a locus where a grid line in which four small quadrangles are formed adjacent to each other inside a quadrangle hole to be drilled is assumed, a part of the grid line is scanned, and four sides of the quadrangles are scanned in the forward and reverse directions. The second scanning locus is a scanning locus such as to make side trips in the middle of the straight line travel.

First, with the quadrangle as a large quadrangle, a grid line in which four small quadrangles are formed adjacent to each other inside the large quadrangle is assumed.

In step 1, the four sides of the large quadrangle are scanned in the forward direction (counterclockwise direction) with the lower left corner of the large quadrangle as a start point and an end point.

In step 2, the lower side of the small quadrangle is scanned in the forward direction with the lower left corner of the lower left small quadrangle as a start point and scanning is performed with the middle of the right side of the small quadrangle as an end point.

In step 3, scanning is performed in the forward direction with the end point of step 2 as a start point and the middle of the upper side of the lower right small quadrangle as an end point.

In step 4, scanning is performed in the forward direction with the end point of step 3 as a start point and the middle of the left side of the upper right small quadrangle as an end point.

In step 5, scanning is performed in the forward direction with the end point of step 4 as a start point and the middle of the lower side of the upper left small quadrangle as an end point.

In step 6, scanning is performed in the forward direction with the end point of step 5 as a start point and the lower left corner of the lower left small quadrangle as an end point.

Next, steps 1 to 6 are performed in the reverse direction (clockwise direction).

Figure 17:
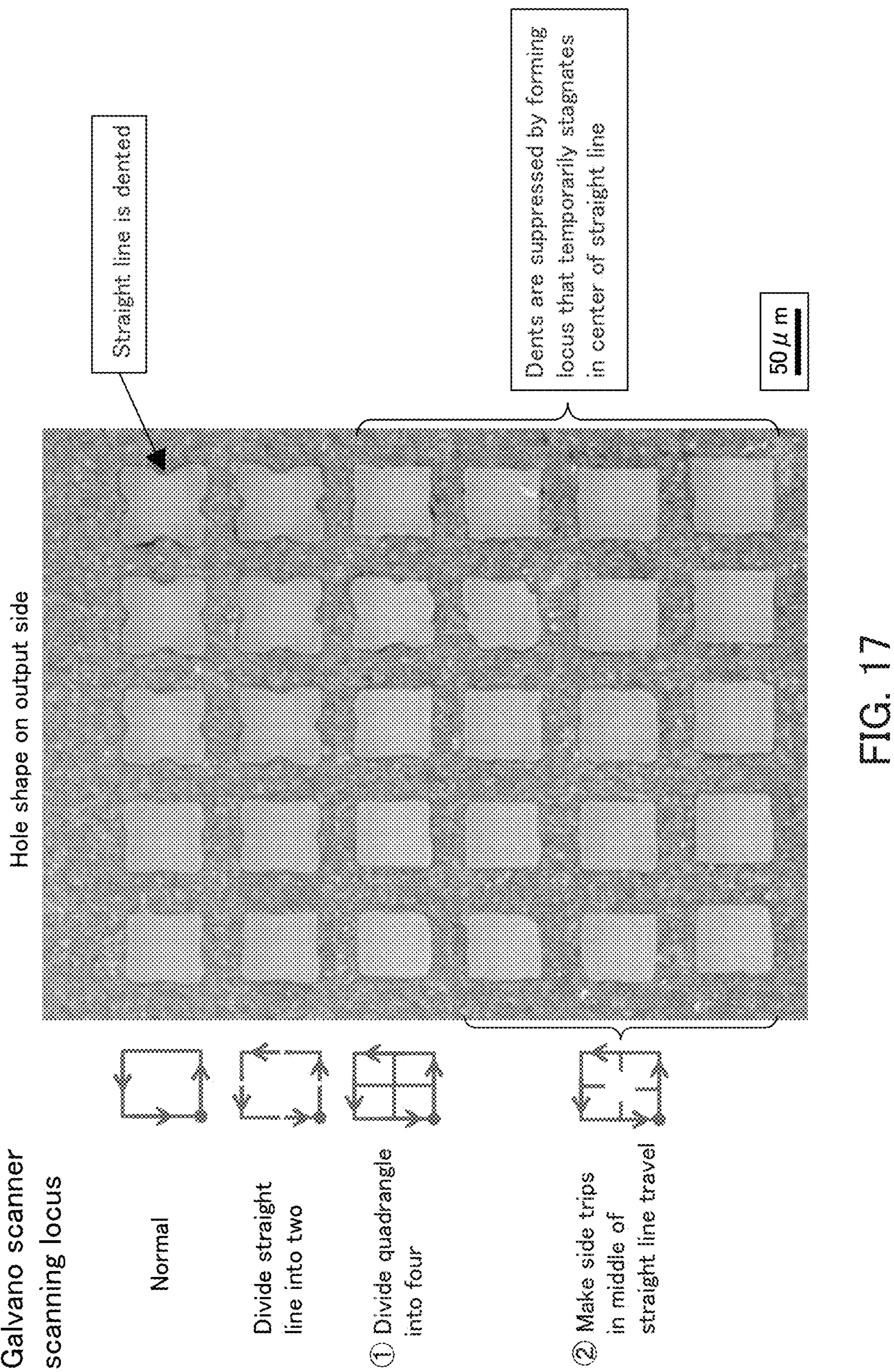
FIG. 17 is a diagram showing scanning loci of the galvano scanner and laser processing states.

FIG. 17 shows a photograph of the result of drilling a quadrangle hole in silicon nitride with a laser beam by various scanning loci (shapes of the holes on the laser beam output side).

In FIG. 17, the first row from the top is an example of scanning the outer circumference of the quadrangle (normal). The second row from the top is an example of scanning by dividing the quadrangle into two (dividing the straight line into two). The third row from the top is the first scanning locus which is an example of dividing the quadrangle into four in a grid pattern (dividing the quadrangle into four). The fourth to sixth rows from the top are the second scanning loci, which are examples of dividing the quadrangle into a grid pattern and scanning a part of the grid line (making side trips in the middle of the straight line travel). As shown in FIG. 17, in the examples of the first row and the second row from the top, the straight lines are dented so that accurate quadrangles are not formed. On the other hand, in the examples of the third to sixth rows from the top, which are the first scanning locus and the second scanning locus, each side of the quadrangle is linear and suppressed from being dented.

As described above, by synchronously controlling the rotation of the polarization rotator and the rotation of the beam rotator, it is possible to make the laser beam in various polarized states. As a result, accurate fine processing can be performed as compared to the conventional laser processing. As a method for changing the polarized state of the laser beam, conventionally, there are a method of using a polarization conversion element and a method of using a liquid crystal axisymmetric converter. However, in the method of using the polarization conversion element, there are problems that the wave plate is expensive and the polarized state is fixed and cannot be changed. Further, in the method of using a liquid crystal axisymmetric converter, there are problems that the transmittance of the laser beam is low and the laser damage threshold is low. As compared to these techniques, the laser beam can be in various polarized states that allows accurate precision processing by synchronously controlling the rotation of the polarization rotator and the rotation of the beam rotator in the laser processing machine. Therefore, the cost is low, and there is no transmittance problem or laser damage threshold problem.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A laser processing machine comprising:
- a laser light source configured to emit a laser beam that is linearly polarized;
- a polarization rotator unit comprising:
  - a wave plate configured to change a polarization direction of the laser beam; and
  - a first rotation actuator configured to rotate the wave plate;
- a beam rotator unit comprising:
  - an irradiation angle adjusting optical system including at least one prism; and
  - a second rotation actuator configured to rotate the irradiation angle adjusting optical system;
- a condensing optical system including at least one lens configured to condense the laser beam on a workpiece; and
- a controller configured to adjust a polarized state of the laser beam by controlling a rotational speed ratio between the first rotation actuator and the second rotation actuator, wherein
- the irradiation angle adjusting optical system is configured to adjust an irradiation angle of the laser beam to the workpiece by making an incident laser beam eccentric to output and making the laser beam incident on the condensing optical system at a position eccentric from a central axis thereof.

2. A laser processing machine comprising:
- a laser light source configured to emit a linearly polarized laser beam;
- a polarization rotator unit;
- a beam rotator unit;
- a condensing optical system including at least one lens;
- at least one rotational driving actuator; and
- a controller, wherein
  - the polarization rotator unit, the beam rotator unit, and the at least one lens are configured to apply the laser beam to a workpiece,
  - the polarization rotator unit comprises a wave plate configured to change a polarization direction of the laser beam,
  - the beam rotator unit comprises an irradiation angle adjusting optical system including at least one prism configured to adjust an irradiation angle of the laser beam to the workpiece by making an incident laser beam eccentric to output and making the laser beam incident on the condensing optical system at a position eccentric from a central axis thereof,
  - the at least one rotational driving actuator is configured to rotate the wave plate and to rotate the irradiation angle adjusting optical system,
  - the at least one lens is configured to condense the laser beam on the workpiece, and
  - the controller is configured to:
  - control the at least one rotational driving actuator to control a rotational speed ratio between the wave plate and the irradiation angle adjusting optical system, and
  - adjust a polarized state of the laser beam by controlling the rotational speed ratio.

3. The laser processing machine according to claim 1, wherein
- the first rotation actuator comprises a first motor and the second rotation actuator comprises a second motor that individually supply rotational driving force to the wave plate and the irradiation angle adjusting optical system, respectively,
- the laser processing machine further comprises a first amplifier and a second amplifier that are connected to the first motor and the second motor, respectively, and
- the controller comprises a motor synchronous controlling unit configured to transmit a control signal to the first amplifier and the second amplifier effective to control the rotational speed of the first motor and the second motor.

4. The laser processing machine according to claim 1, wherein the wave plate is a λ/2 plate.

5. The laser processing machine according to claim 2, wherein
- the at least one rotational driving actuator comprises a first rotation actuator configured to rotate the wave plate and a second rotation actuator configured to rotate the irradiation angle adjusting optical system, wherein a rotational speed ratio (X:Y) between a rotational speed (X) of the first rotation actuator and a rotational speed (Y) of the second rotation actuator is one of 1.5:1, −0.5:1, or 0.5:1.

6. The laser processing machine according to claim 1, wherein
- the controller is further configured to control a rotational phase difference between the first rotation actuator and the second rotation actuator,
- a first initial position of the first rotation actuator is a rotation angle in which a polarization direction of the laser beam and a fast axis direction of the wave plate coincide,
- a second initial position of the second rotation actuator is a rotation angle in which the polarization direction of the laser beam and a beam eccentric direction of the beam rotator unit coincide, and
- the rotational phase difference is a phase difference between the first initial position and the second initial position.

7. The laser processing machine according to claim 2, further comprising:
- a processing stage, wherein
- the processing stage is configured to hold the workpiece and is movable in a horizontal direction.

8. The laser processing machine according to claim 2, further comprising:

a galvano scanner, wherein the galvano scanner is configured to scan the workpiece with the laser beam condensed by the condensing optical system.

9. The laser processing machine according to claim 8, wherein the controller is further configured to control scanning of the laser beam by the galvano scanner.

10. The laser processing machine according to claim 2, wherein the beam rotator unit further comprises a rotation radius adjusting optical system comprising at least one prism, configured to:

tilt an incident laser beam with respect to an incident optical axis, make the laser beam obliquely incident on the condensing optical system, and annularly scan an irradiation position of the workpiece with the laser beam.

11. The laser processing machine according to claim 2, wherein the at least one rotational driving actuator comprises a first motor and a second motor that individually supply rotational driving force to the wave plate and the irradiation angle adjusting optical system, respectively, and the laser processing machine further comprises a first amplifier and a second amplifier that are connected to the first motor and the second motor, respectively, and the controller comprises a motor synchronous controlling unit configured to transmit a control signal to the first amplifier and the second amplifier effective to control the rotational speed of the first motor and the second motor.

12. The laser processing machine according to claim 11, wherein the controller is further configured to control a rotational phase difference between the first motor and the second motor, a first initial position of the first motor is a rotation angle in which a polarization direction of the laser beam and a fast axis direction of the wave plate coincide, a second initial position of the second motor is a rotation angle in which the polarization direction of the laser beam and a beam eccentric direction of the beam rotator unit coincide, and the rotational phase difference is a phase difference between the first initial position and the second initial position.

* * * * *